United States Patent
Hoefelmeyer et al.

(10) Patent No.: US 7,150,044 B2
(45) Date of Patent: Dec. 12, 2006

(54) SECURE SELF-ORGANIZING AND SELF-PROVISIONING ANOMALOUS EVENT DETECTION SYSTEMS

(75) Inventors: Ralph Samuel Hoefelmeyer, Colorado Springs, CO (US); Theresa E. Phillips, Fairfax, VA (US); Shawn Edward Wiederin, Cedar Rapids, IA (US)

(73) Assignee: MCI, LLC, Basking Ridge, NJ (US)

( * ) Notice: Subject to any disclaimer, the term of this patent is extended or adjusted under 35 U.S.C. 154(b) by 245 days.

(21) Appl. No.: 10/385,229

(22) Filed: Mar. 10, 2003

(65) Prior Publication Data
US 2004/0181664 A1    Sep. 16, 2004

(51) Int. Cl.
G06F 11/30    (2006.01)
G06F 15/173   (2006.01)

(52) U.S. Cl. ............... 726/23; 726/25; 709/223; 709/224

(58) Field of Classification Search ............ 713/157; 726/23, 25; 709/224, 223
See application file for complete search history.

(56) References Cited

U.S. PATENT DOCUMENTS

| | | | |
|---|---|---|---|
| 5,557,742 A * | 9/1996 | Smaha et al. | 713/200 |
| 6,158,010 A * | 12/2000 | Moriconi et al. | 713/201 |
| 6,178,505 B1 | 1/2001 | Schneider et al. | 713/168 |
| 6,347,374 B1 * | 2/2002 | Drake et al. | 713/200 |
| 2003/0084329 A1 * | 5/2003 | Tarquini | 713/200 |
| 2004/0123141 A1 * | 6/2004 | Yadav | 713/201 |

* cited by examiner

*Primary Examiner*—Gilberto Barrón, Jr.
*Assistant Examiner*—Kaveh Abrishamkar

(57) ABSTRACT

An approach for providing managed security services is disclosed. A database, within a server or a pre-existing anomalous event detection system, stores a rule set specifying a security policy for a network associated with a customer. An anomalous detection event module is deployed within a premise of the customer and retrieves rule sets from the database. The anomalous detection event module monitors a sub-network of the network based on the rule sets. The anomalous event detection module is further configured to self-organize by examining components of the network and to monitor for anomalous events according to the examined components, and to self-provision by selectively creating another instance of the anomalous detection event module to monitor another sub-network of the network.

29 Claims, 9 Drawing Sheets

SECURE SELF-ORGANIZING AND SELF-PROVISIONING ANOMALOUS EVENT DETECTION SYSTEMS

FIELD OF THE INVENTION

The present invention relates to data communications, and more particularly, to detection of anomalous events within data networks.

BACKGROUND OF THE INVENTION

The phenomenal growth of data networking has presented communication service providers with the continual challenge of responding to the millions of customers' demands for secure, reliable, and fast access to their networks. Such demands are particularly onerous when the customers (e.g., major corporations) utilize or interact with a number of geographically disperse networks—i.e., an enterprise network. For example, corporate users interact closely with other business partners in their regular conduct of business, and thus, the networks of these business partners require a certain level of reliability and security as well. Satisfying these demands is imperative to maintaining a competitive edge in an intensely competitive market. To further intensify the challenge of supplying fast and reliable communication services, service providers and their customers frequently are victims of various types of security threats that negatively impacts service availability. Conventional approaches to addressing security have been unsatisfactory in part because network attacks are seldom isolated to a particular local network, but can be coordinated across the entire enterprise network, and because of false positive of attacks, which results in waste of precious network resources.

FIG. 9 is a diagram of conventional system for detecting network intrusions across an enterprise network. As seen in the figure, a customer, such as a large business, has an enterprise network 900 that spans a number of sites A, B, C, and D, which operate respective local networks 901, 903, 905, and 907. Traditionally, these local networks 901, 903, 905, and 907 are managed locally using local network management systems (NMSs) 909, 911, 913, and 915 that are seldom integrated for monitoring and analysis of network events across the entire network 900. That is, these NMSs 909, 911, 913, and 915 are traditionally isolated, sharing little information on security threats. This lack of coordination is made evident particularly when the collective network events are numerous; in a typical enterprise network 900, the number of events can total in the tens to hundreds of millions. Under such an arrangement, an intruder 917 can readily mask its attack on the enterprise network by initiating false attacks to site A, while the true attack on the local network 905 of site C.

For instance, the intruder 917 can launch a denial-of-service (DoS) attack in site A to impact site C. A DoS attack is initiated to deliberately interfere or disrupt a customer's datagram delivery service. One type of DoS attack is a packet flood attack that provides constant and rapid transmission of packets to the victim computing system. The flood attack overwhelms the victim's connection. Examples of packet flood attacks specific to Unreliable Datagram Delivery Service Networks utilizing IP (Internet Protocol) include ICMP (Internet Control Message Protocol) flood, "SMURF" (or Directed Broadcast Amplified ICMP Flood), "Fraggle" (or Directed Broadcast UDP (User Datagram Protocol) Echo Flood), and TCP (Transmission Control Protocol) SYN flood. These attacks effectively prevent the subscribers from communicating to other hosts; in some circumstances, the effects of these attacks may cause a victim host to freeze, thereby requiring a system reboot. In addition to being a nuisance, a system freeze can result in lost of data if precautions were not taken in advance.

In response to the attacks of the intruder 917, the NMS 909 of site A may effectively shut down the communication interface and/or network elements responsible for connecting to site C. Accordingly, the NMS 909 of site A may unknowingly believe it has nullified the attack, when in fact, site C is negatively impacted. The NMS 913 of site C is unaware that site A has encountered attacks from the intruder 917, and therefore, cannot properly respond to the loss of connectivity to site A.

Further, the conventional security mechanisms, such as intrusion detection systems and firewalls, of the sites A, B, C, and D can be ineffective against certain types of attacks. For example, if the attack by the intruder 917 is slow over a long period. Additionally, traditional intrusion detection systems are merely signature-based. Consequently, new attacks in which no signature has been developed will go undetected until the subject signature is created.

Another drawback of conventional security systems for detecting anomalous events is that they are expensive to maintain and operate, given the continual introduction of new threats. Accordingly, customers seek service providers to offer a managed service, thereby eliminating the need to purchase the necessary hardware and software platforms and associated personnel. However, traditionally, attempts to provide managed security services have been manually intensive with respect to provisioning and installation.

Therefore, there is a need for detecting and resolving network security attacks across the entire enterprise network. There is also a need for a near real-time security mechanism that can protect against novel attacks and slow attacks. There is a further need to provide a security approach that can be easily deployed as a managed service.

SUMMARY OF THE INVENTION

These and other needs are addressed by the present invention, in which approach for supporting managed security services utilizes a system that is self-organizing and self-provisioning to detect anomalous events with one or more enterprise networks (or networks supporting collaboration among users—e.g., business partners). The anomalous event detection system, upon installation within the customer's premise, establishes a secure communication link (e.g., a Virtual Private Network (VPN) tunnel) to either a provisioning server or a pre-existing anomalous event detection system within the enterprise network for retrieval or rule sets associated with the enterprise network. The rule sets, according to one embodiment, specifies security policies governing the enterprise network. These rule sets can be updated, near real-time, across the enterprise network by the anomalous event detection system. When multiple anomalous event detection systems are installed within the enterprise network, these systems can form a cluster to efficiently share network resources. The above arrangement advantageously reduces false positives in network attack warnings.

In one aspect of the present invention, a method for supporting managed security services is disclosed. The method includes scanning an enterprise network that includes a plurality of interconnected networks to locate a database storing a rule set specifying a security policy for the enterprise network. The method also includes accessing the database over a secure communication link to retrieve the rule set. Further, the method includes monitoring one of the networks according to the retrieved rule set.

In another aspect of the present invention, a system for providing managed security services is disclosed. The system includes a database configured to store a rule set specifying a security policy for a network associated with a customer. The system also includes an anomalous detection event module deployed within a premise of the customer and configured to retrieve the rule set from the database and to monitor a sub-network within the network based on the rule set. The anomalous event detection module is further configured to self-organize by examining components of the network and to monitor for the anomalous event according to the examined components, and to self-provision by selectively creating another instance of the anomalous detection event module to monitor another sub-network of the network.

In another aspect of the present invention, a computer-readable medium carrying one or more sequences of one or more instructions for supporting managed security services is disclosed. The one or more sequences of one or more instructions include instructions which, when executed by one or more processors, cause the one or more processors to perform the steps scanning an enterprise network that includes a plurality of interconnected networks to locate a database storing a rule set specifying a security policy for the enterprise network; and accessing the database over a secure communication link to retrieve the rule set; and monitoring one of the networks according to the retrieved rule set.

In yet another aspect of the present invention, a network apparatus for supporting managed security services is disclosed. The apparatus includes means for scanning an enterprise network that includes a plurality of interconnected networks to locate a database storing a rule set specifying a security policy for the enterprise network. The apparatus also includes means for accessing the database over a secure communication link to retrieve the rule set, and means for monitoring one of the networks according to the retrieved rule set.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for detecting anomalous network events are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
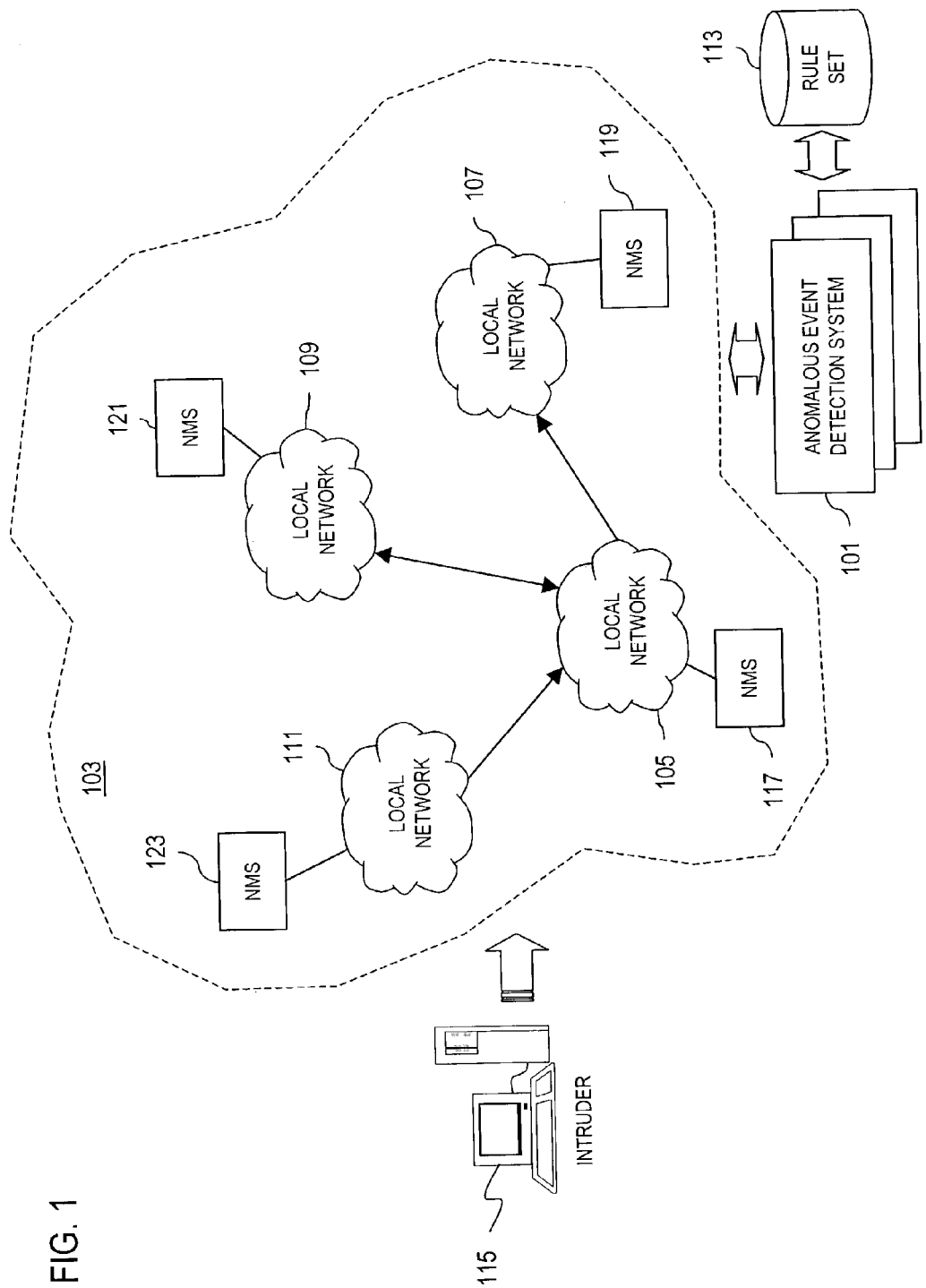
FIG. 1 is a diagram of system for detecting anomalous events across an enterprise communication system, in accordance with an embodiment of the present invention.
Figure 4:
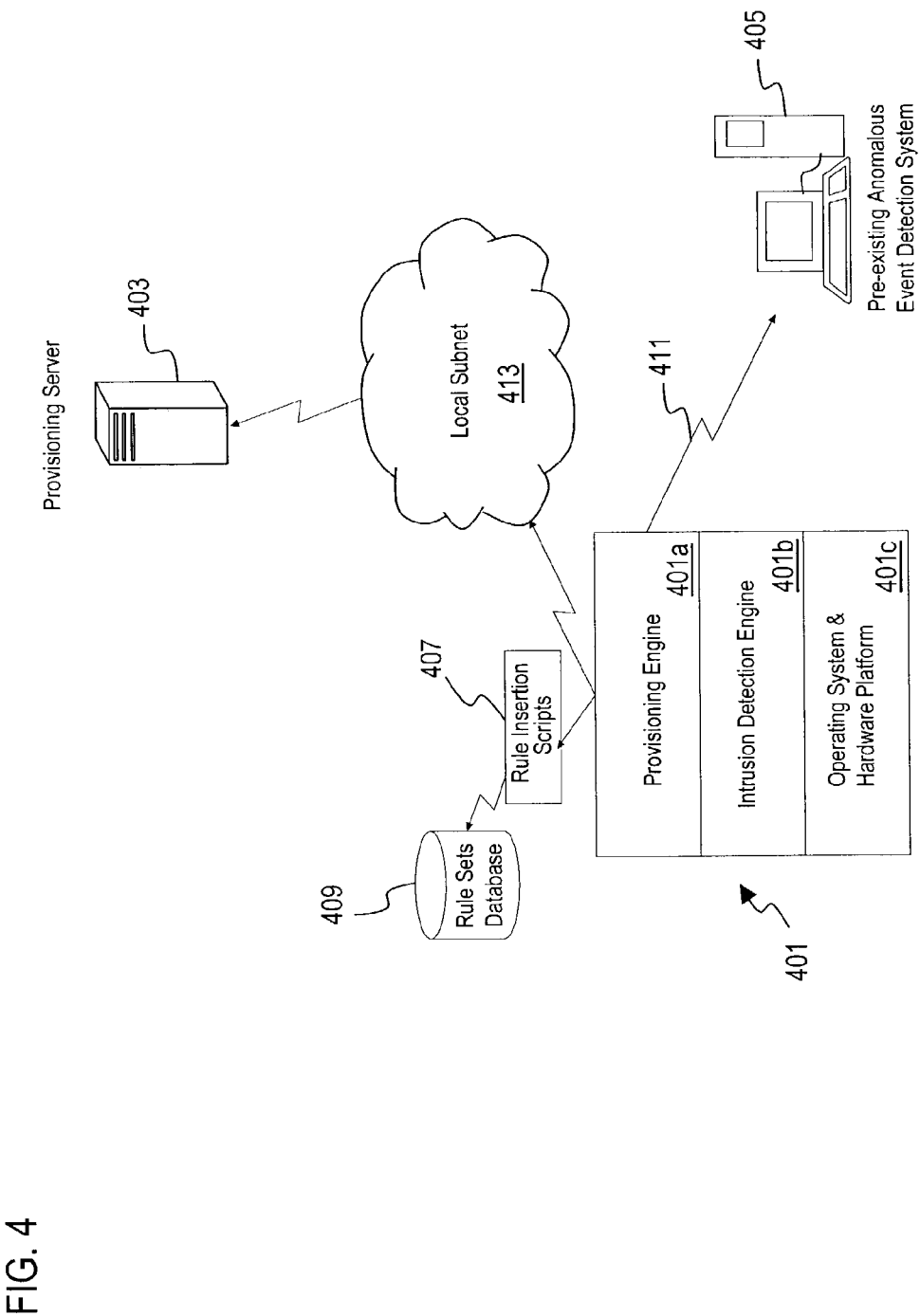
FIG. 4 is a diagram of a self-organizing, self-provisioning system utilizing a provisioning engine to automatically obtain rule sets within an enterprise, in accordance with an embodiment of the present invention.
Figure 5:
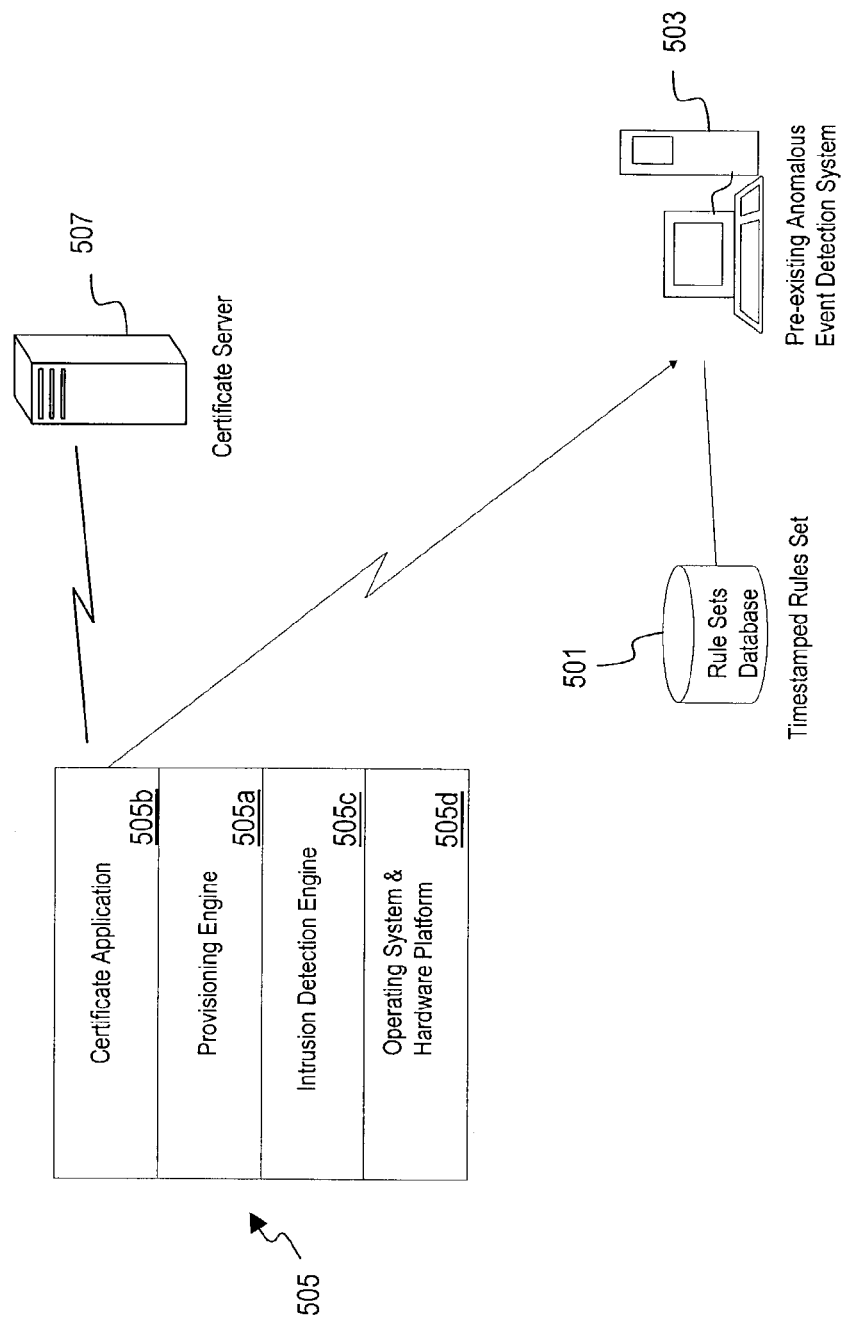
FIG. 5 is a diagram of a self-organizing, self-provisioning system utilizing a secure communication channel to retrieve rule sets in support of detection of anomalous events, in accordance with an embodiment of the present invention.
Figure 7:
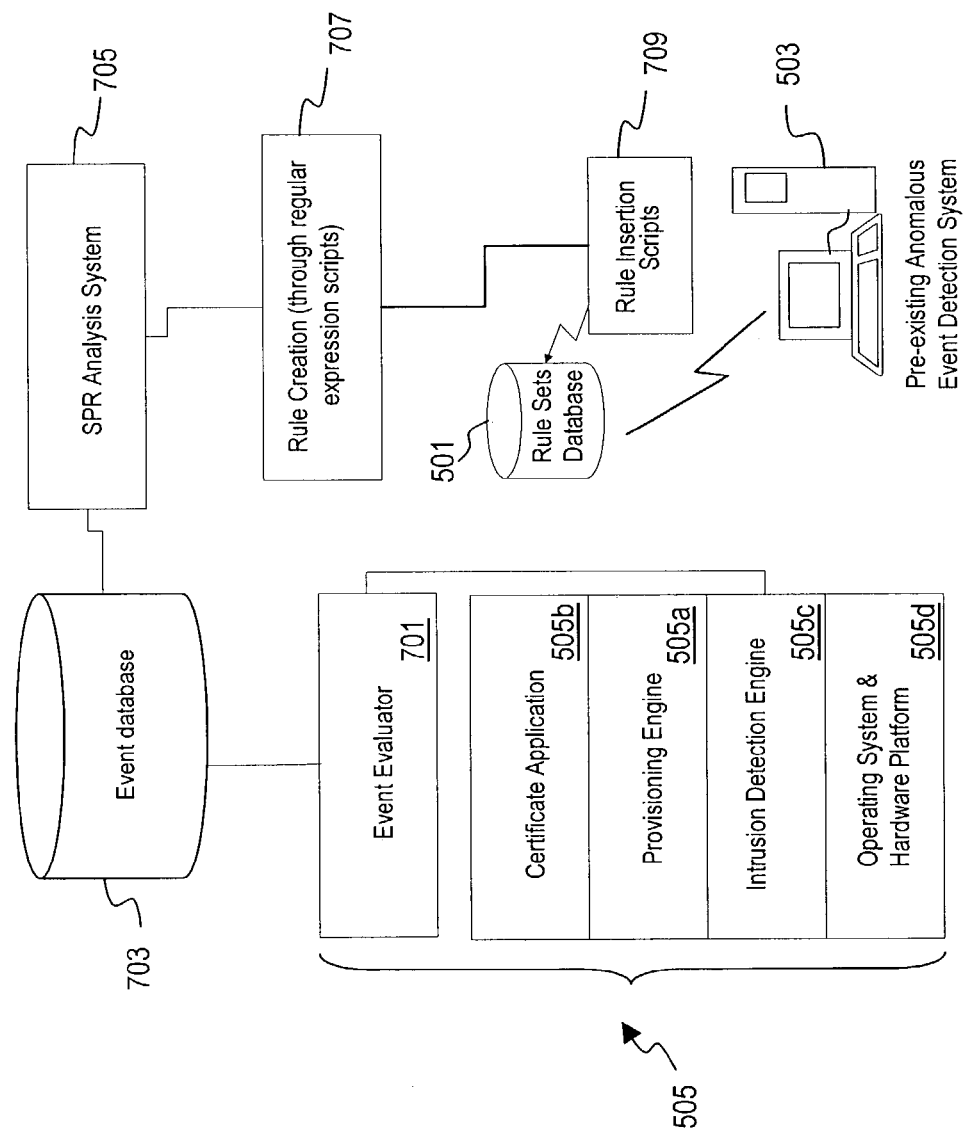
FIG. 7 is a diagram of an event database used in the system of FIG. 5.

FIG. 1 is a diagram of system for detecting anomalous events across an enterprise communication system, in accordance with an embodiment of the present invention. Conceptually, one or more anomalous event detection systems 101 serve an enterprise network 103, which includes multiple local networks 105, 107, 109, and 111. As used herein, the term "enterprise network" refers to multiple local networks supporting collaboration among users, in which the users have some type of relationship; for example, the users may be from a common business entity or organization, or may have a business relationship. The systems 101 provide a multi-layer and multi-threaded security option for preventing attacks, such that no method of attack can negatively impact the entire enterprise network. The multi-layered nature of the system is seen in FIGS. 4, 5, and 7. The software application implementing the anomalous event detection systems 101 is thus capable of concurrent processing. The systems 101 have applicability to a wide variety of network events relating to network management and security, such as trouble-shooting of the network and the applications. For illustrative purposes, the systems 101 are described with respect to intrusion detection.

Intrusion detection involves detecting activities that originate from outside of the network 103 and are inappropriate, incorrect, or anomalous, by utilizing, for example, statistical anomaly detection or pattern-matching detection. The system 101 inspects all traffic, irrespective of whether the traffic is authorized or unauthorized, examining the data at network layer and higher, such as the Internet Protocol (IP) layer or the Application layer, and generating an alert if an anomaly is discovered. This functionality is more sophisticated that a network firewall, which merely provides access control to a particular service or host based on a set of rules without examination of the content of the data flow. This set of rules, in an exemplary embodiment, can include predictive rules, which are "if . . . then . . . " style rules. In the classification problem space, the "if" section describes a set of attribute values, and the "then" section the class.

Predictive rules form a hyper-rectangle in the data space. Predictive rules may be ordered or unordered. If unordered, several rules may apply, in which case a conflict resolution strategy is invoked. Ordered rules form what is called a decision list, where rules are invoked in a given order. A default rule is used if no other rule is invoked. Different mechanisms exist to generate such rules—one approach is to generate a decision tree to define a predictive set of rules, where each leaf in the tree is a rule. In a statistical approach, such as Receiver Operating Characteristic (ROC) curves, probabilities of invocation are utilized to assign rule position. An exemplary rule set is detailed in "Discovering Predictive Association Rules" by N. Megiddo and R. Srikant (Copyrighted 1998, American Association for Artificial Intelligence (www.aaai.org)), which is incorporated by reference herein in its entirety.

Moreover, the system 101 allows for near real time updates of these rules across the enterprise or multiple enterprises.

According to an embodiment of the present invention, an anomalous event detection system 101 is deployed at the respective customer premises associated with the local networks 105, 107, 109, and 111, in which a centralized database 113 exists to store the rule sets for specifying the security policies that govern the enterprise network 103 and prevent, for example, intrusion from an intruder 115. According to one embodiment of the present invention, any standards based intrusion detection rule format can be utilized. Under this architecture, the anomalous event detection system 101 can provide a coordinated approach to security management to reduce false positives of network attack warnings, and thereby minimizes alarm traffic on the enterprise network.

The system 101 can also be deployed to be redundant and resilient; that is, there are no single points of failure, in which multiple failures may cause degradation of service, but not failure. Further, the anomalous event detection systems 101 can correspondingly interoperate with the network management systems (NMSs) 117, 119, 121, and 123 of the respective local networks 105, 107, 109, and 111.

Figure 9:
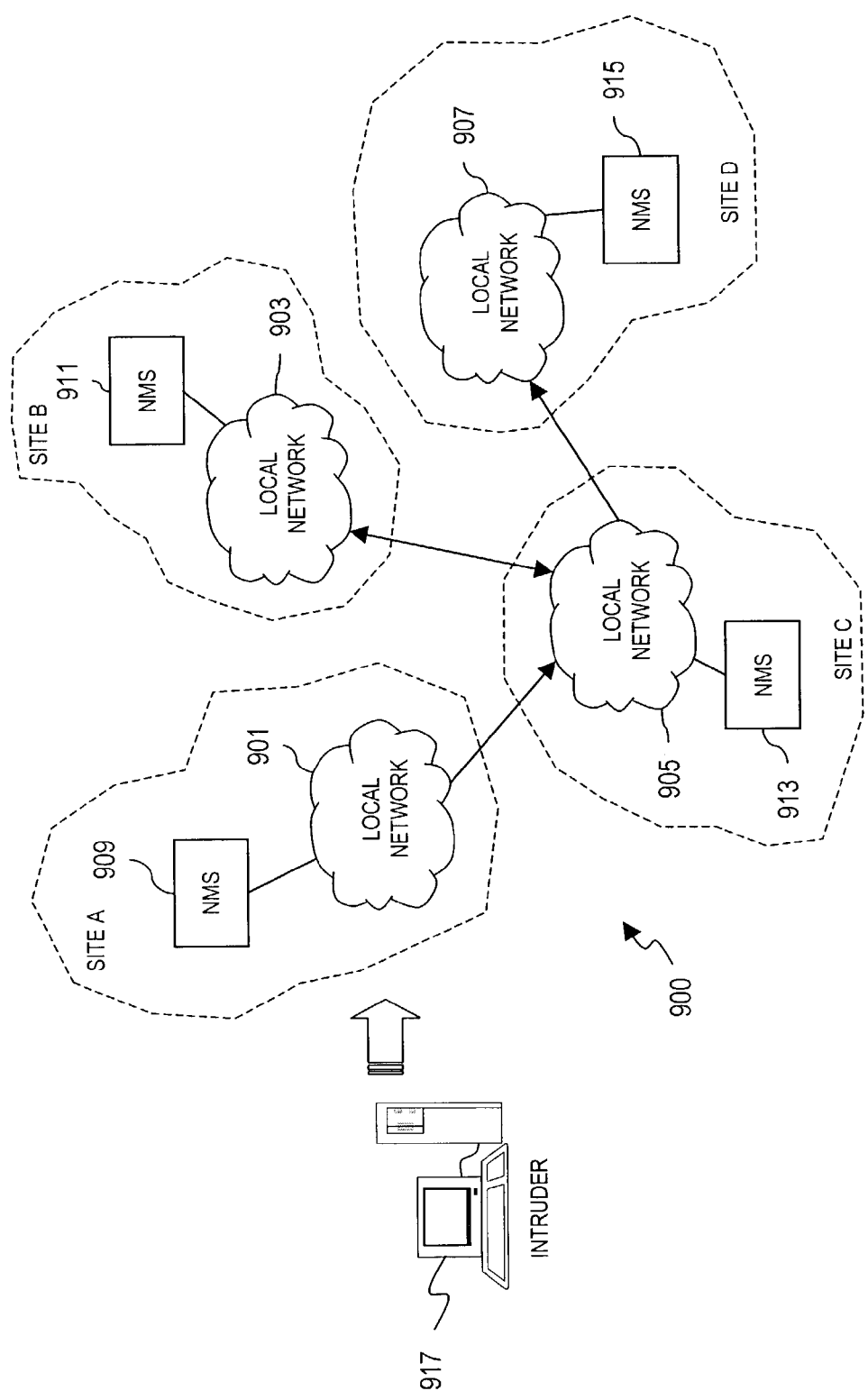
FIG. 9 is a diagram of conventional system for detecting network intrusions across an enterprise network.

In accordance with one embodiment of the present invention, the anomalous event detection systems 101 can be deployed as customer premise equipment by a service provider as a managed service. Such deployment advantageously reduces attack response time for customers, as compared to traditional systems (e.g., the system of FIG. 9).

The anomalous event detection system 101 is advantageously self-organizing and self-provisioning. Self-organization, as used herein, denotes a system structure that behaves without explicit pressure or involvement from outside the system. As a self-organizing system, the anomalous event detection system 101 accounts for the network elements within the enterprise network 103, such that the monitoring of the events is tailored to those elements. For example, if the enterprise network 103 does not utilize a server farm, then the events associated with the operation and maintenance of the server farm are not monitored. Moreover, if the enterprise network 103 is largely a router-based network, then the anomalous event detection system 101 would concentrate on processing of events relating to routers.

The anomalous event detection system 101 also has the capability to self-provision by determining whether an instance of itself exists within a particular local network or subnet. If no instance exists, then the system 101 creates an instance as part of the provisioning process. Also, the system 101 can automatically create additional instances of itself to accommodate any growth of the enterprise network 103, thereby minimizing manual intervention in the provisioning process. Accordingly, the above system 101 supports provisioning and customizing rule sets across an enterprise in a scaleable and highly resilient fashion. The rule sets can be obtained from either a provisioning server or another anomalous event detection system 101 in the same cluster (as explained in FIG. 4).

Figure 2:
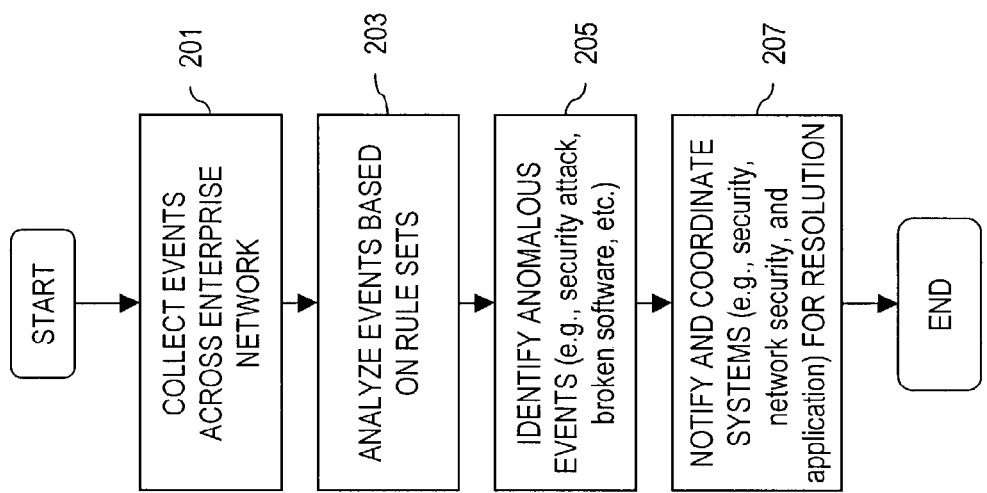
FIG. 2 is a flowchart of a process for detecting anomalous events in the system of FIG. 1.

FIG. 2 is a flowchart of a process for detecting anomalous events in the system of FIG. 1. In step 201, the system 101 collect network events across the enterprise network 103. In the case of intrusion detection, the system 101 examines all the traffic entering and traversing the enterprise network 103. The system 101, as in step 203, analyzes the events or traffic based on rule sets to identify anomalous events, such as security attacks, broken software, and etc. (per step 205). The system 101, in an exemplary embodiment, employs algorithms from the artificial intelligence domain and scripts to perform actions dictated by events or observations. Consequently, this alleviates the need for intensive human operations, such as manually provisioning and configuring the device with manually created rules. In addition, the system 101 can capture changes in the security environment and propagate those changes significantly faster than manual methods across one or more enterprises.

In part because the events across the entire enterprise network 103 are examined collectively, the analysis can better target and extract the true source of attack, thereby eliminating false positives of such attacks. In response to the anomalous events, the system 101 notifies the network management systems 117, 119, 121, and 123 of the respective autonomous systems 105, 107, 109, and 111 (per step 207) of the nature of the events. In this manner, the network management systems 117, 119, 121, and 123 can take appropriate action in a coordinated fashion.

Figure 3:
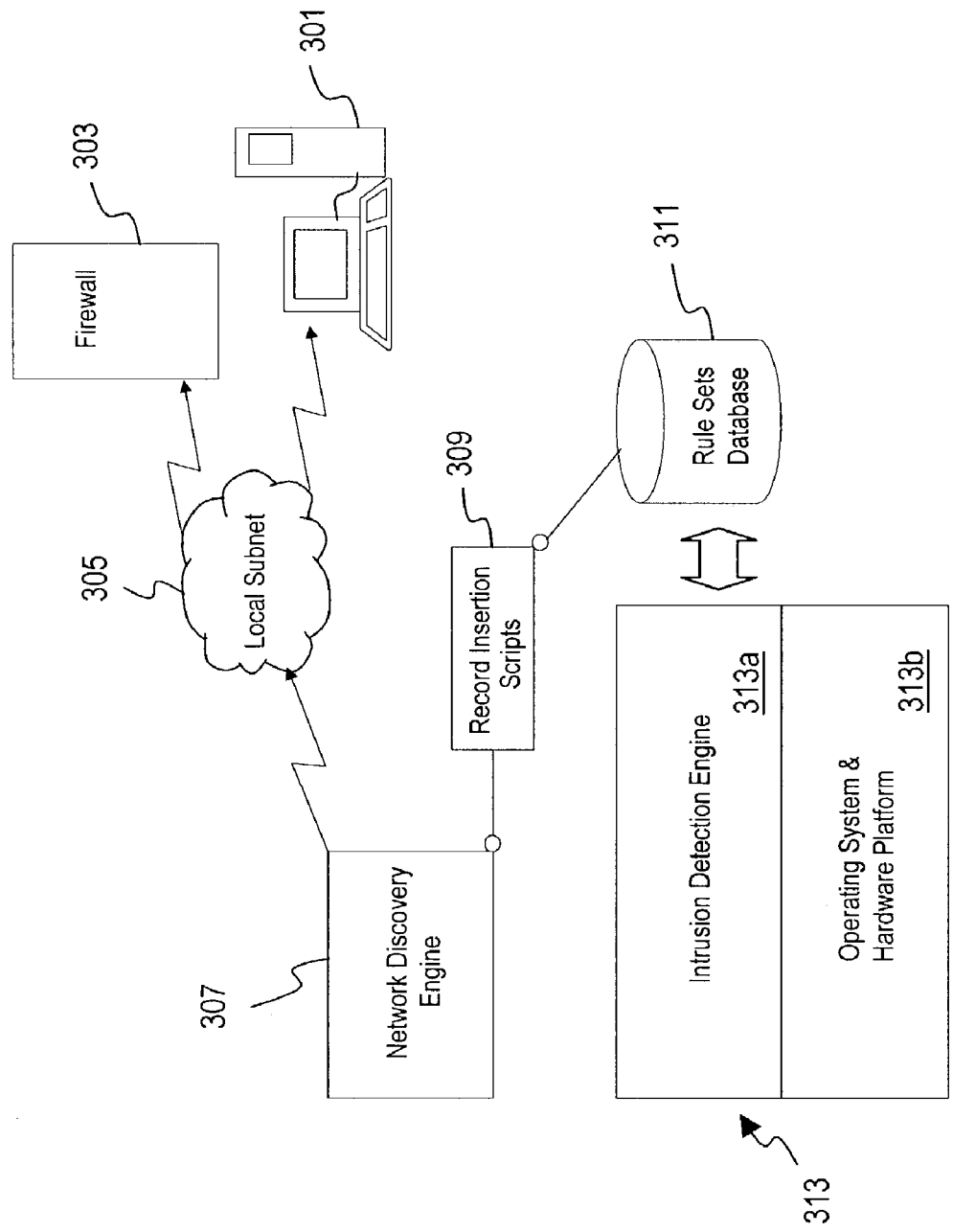
FIG. 3 is a diagram of a self-organizing, self-provisioning system utilizing a network discovery engine and an intrusion detection engine to support detection of anomalous events, in accordance with an embodiment of the present invention.

FIG. 3 is a diagram of a self-organizing, self-provisioning system utilizing a network discovery engine and an intrusion detection engine to support detection of anomalous events, in accordance with an embodiment of the present invention. As shown, a server 301 records events generated from a firewall 303, which protects a local network 305 (or local subnet if part of a larger enterprise network) from unauthorized access to the local subnet 305.

A network discovery engine 307, in conjunction with record insertion scripts, discovers the local subnet 305 to generate records associated with the firewall events. In an exemplary embodiment, the network discovery engine 307, such as Network Mapper ("NMAP"), can be integrated with a database 311 (e.g., an open source database—MySQL) using scripts (e.g., Perl) to channel information in the database 311. NMAP, which is an open source utility for network exploration, provides a capability to rapidly scan large networks to determine availability of hosts within the network 305, as well as a variety of information on these hosts, such as the services (ports) offered, operating system (and OS version), firewalls being used, etc. Record insertion scripts 309 are used to populate the database 311 with the information from the scans by the network discovery engine 307.

The records generated from the firewall 303 are stored in the database 311 that is attributed to the local subnet 305. In particular, the database 311 also stores information on the devices (e.g., firewalls, routers, and servers) on the subnet 305, such as device type, address (e.g., Internet Protocol (IP) address, operating system (OS), application, etc.). The database 311 is accessed by an anomalous event detection system 313, which includes, according to one embodiment of the present invention, an intrusion detection engine 313a resident on an operating system and associated operating system and hardware platform 313b for detecting any inappropriate, incorrect, or anomalous activity within the local subnet 305. In an exemplary embodiment, the platform 313b can be LINUX on an INTEL® central processing unit (CPU).

According to one embodiment of the present invention, the intrusion detection engine 313a can be signature-based (e.g., SNORT), and/or heuristic (e.g., thresholding techniques) or artificial intelligence (AI) (e.g., rough set theory) based. Although a single anomalous event detection system 313 is shown, it is contemplated that one more such systems 313 can be deployed, whereby all of the system 313 within an enterprise would constitute a cluster. Clustering enhances system availability and ease of management by supporting interconnectivity of multiple servers.

The system 313 can be situated within the firewall 303, as shown in FIG. 3, or outside the firewall 303. If placed within the firewall 303, the system 313 can monitor traffic that has been cleared by the firewall 303 but nevertheless may be malicious, thereby taking advantage of the filtering performed by the firewall 303. Alternatively, the system 313 can be deployed outside of the firewall 303. By being situated between the firewall 303 and an external untrusted network (not shown), the system 313 can detect both attacks that go through the firewall 303 and attacks that are blocked by the firewall 303.

FIG. 4 is a diagram of a self-organizing, self-provisioning system utilizing a provisioning engine to automatically obtain rule sets within an enterprise, in accordance with an embodiment of the present invention. In this scenario, an anomalous event detection system 401 includes a provisioning engine 401a, along with an intrusion detection engine 401 residing atop an operating system and hardware platform 401c. The intrusion detection engine 401b can obtain the rule sets from a provisioning server 403 (which can be maintained external to the network of the customer) or from a pre-existing anomalous event detection system 405 that has been previously installed.

The systems 401, 405, in an exemplary embodiment, can be part of a cluster. A keep-a-live routine (KR) sends a status to another pre-existing anomalous event detection system 405 in the cluster. When a KR is not received from the anomalous event detection system 401 in the cluster for a predetermined number of consecutive time periods (e.g., three times), the system 401 negotiates the dispersal of monitoring functions across the cluster. The dispersal is negotiated using, for example, round robin dispersal or weighted round trip routing times to determine which devices are given to which anomalous event detection system.

The provisioning engine 401a can modify the rule sets based on inputs from other provisioning engines of other anomalous event detection systems and information on hosts of the local subnet 413, or based on information supplied by the provisioning server 403. The provisioning engine 401 can utilize regular expression scripts or codes to modify the rule sets as necessary for the given subnet 413, as to cover any gaps in device coverage over the subnet 413.

The provisioning server 403, in conjunction with the provisioning engine 401a, assists with the provisioning of the instances of the anomalous event detection system 401 across an enterprise network. The provisioning engine 401a utilizes rules and scripts that are stored based on, for example, signatures obtained from the intrusion detection engine 401b. The rule sets inserted via rule insertion scripts 407 are stored in a database 409. As mentioned previously, the provisioning engine 401 of the anomalous event detection system 401 can also communicate with another anomalous event detection system 409 to obtain rule sets over, for example, a secure link 411, as more fully described below in FIG. 5. Under this scenario, the system 401 self-provisions to guard the local subnet 413.

FIG. 5 is a diagram of a self-organizing, self-provisioning system utilizing a secure communication channel to retrieve rule sets in support of detection of anomalous events, in accordance with an embodiment of the present invention. According to one embodiment of the present invention, a master database 501 stores rule sets for the entire enterprise network. Because rules are continually updated, the most recent rules are time-stamped to ensure that the latest rules are effected. In this example, the master database 501 is maintained by an existing anomalous event detection system 503.

Under this scenario, additional security is supplied, in which a self-provisioning anomalous event detection system 505 includes a certificate application 505a to self-validate. The certificate application 505a controls access by applications to the digital certificate, which can be an X.509 Version 3 certificate, for example. The X.509 standard specifies the signature, as well as the following fields: Version, Serial Number, Signature Algorithm Identifier, Issuer Name, Validity Period, and Subject Name. The Version field specifies the version, which in this instance is version 3. The Serial Number is a unique identifier assigned by the entity that created the certificate. The Signature Algorithm Identifier field identifies the algorithm used by the Certification Authority (CA) to sign the certificate. The Issuer Name field specifies the X.500 name of the entity that signed the certificate. The Validity Period field specifies the duration in which the certificate is valid. Lastly, the Subject Name field indicates the name of the entity whose public key the certificate identifies; the name uses the X.500 standard.

The validation process is critical to security sensitive networks, such as that of a large corporate network or a government (e.g., military) installation. This additional level of security may not be needed, for example, in residential or small business environments. The system 505 retrieves and selectively modifies rules, which are to be inserted into the master rule set within the database 501.

As with the system 401 of FIG. 4, the anomalous event detection system 505 includes a provisioning engine 505a an intrusion detection engine 505c, and an operating system and hardware platform 505d.

As part of the validation process, a certificate server 507, implementing a public-key cryptography scheme, sends a public-key certificate to a certificate application 505b of the anomalous event detection system 505 for "signing" the rules. Under a managed service environment, a service provider can generate a digital certificate for a customer and load the digital certificate onto the anomalous event detection system 505. The service provider can then ship the system 505 to the customer site for installation by the customer into the customer's network. In the case of an initial installation, the system 505 contacts the provisioning server 507 of the service provider via, for example, an Internet Protocol (IP) Virtual Private Network (VPN) tunnel to obtain the relevant rule sets. The certificate application 505b has responsibility for establishing the VPN tunnels, using, for example, Internet Protocol Security (IPSec) protocol and key management protocol (IKE) as promulgated by the IIP Security Protocol Working Group.

Essentially, the system 505 self-provisions and scans the local enterprise for any pre-existing anomalous event detection systems. In the case of a subsequent installation, the system 505 is placed in a customer enterprise with other anomalous event detection systems (e.g., system 503), in which the new system 505 contacts this pre-existing system 503 for the enterprise rule sets and information about the subnet that the new system 505 is to protect. The self-provisioning process is further detailed below with respect to FIG. 6.

Figure 6:
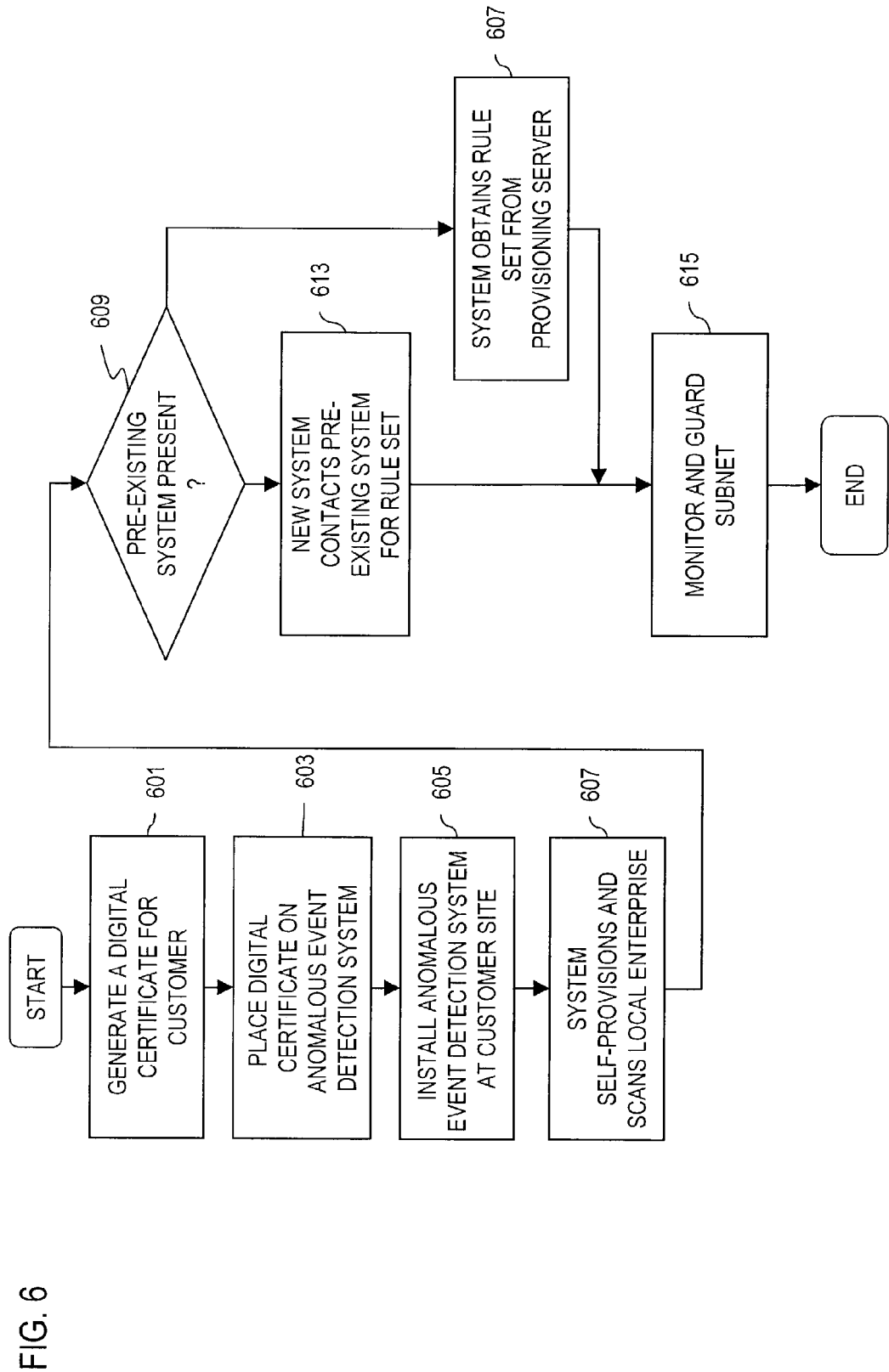
FIG. 6 is a flowchart of a self-provisioning process used in the system of FIG. 5.

FIG. 6 is a flowchart of a self-provisioning process used in the system of FIG. 5. Assuming that a service provider seeks to provide managed security services to a customer, the installation process is described as follows. In steps 601 and 603, a digital certificate for a particular customer is generated and installed in the anomalous event detection system 505. It is recognized that the digital certificate can be pre-loaded or obtained through a secure certificate provisioning process on deployment. The anomalous event detection system 505 is then installed at the customer's site (or premise), as in step 605.

At this point, the anomalous event detection system 503, as in step 607, self-provisions and scans the local network to determine whether a pre-existing anomalous event detection system is present (per step 609). As noted earlier, self-provisioning involves determining whether instances of the software exist in the network as well as determining whether additional instances need to be created. If an anomalous event detection system has been previously installed within the local network, as in step 611, the intrusion detection engine 505*c* of the system 505 establishes a communication session with the pre-existing system 503 to obtain the rule set for the enterprise. Specifically, the pre-existing anomalous event detection system 503 receives a request for provisioning information from the system 505, which is considered as a part of the same cluster as that of the system 503. The rule sets of the cluster, according to an embodiment of the present invention, are provided via a VPN tunnel, and signed with the certificate of the original provider (i.e., system 503). The cluster rule set with the most recent time is the controlling rule set for propagation through the cluster. The certificate application controls the certificate (e.g., X.509 Version 3) and dictates whether applications can access the certificate.

However, if no anomalous event detection system pre-exists, then the system 505 can acquire these rule sets from a provisioning server (step 613). As mentioned, the provisioning server can be maintained by the service provider within the service provider's network (e.g., network operations center) and can be accessed, for example, via the global Internet.

Upon obtaining the rule sets, the new anomalous event detection system 503 can secure the subject network (or subnet), per step 615.

FIG. 7 is a diagram of an event database used in the system of FIG. 5. As shown, evaluation of events of the network can be analyzed through the use of an event evaluator 701, which retrieves information regarding these events from an event database 703. The event database 703 can be centralized or distributed across multiple anomalous event detection systems 503, 505. Under this scenario, the event evaluator 701 is considered a part of the system 505.

The event evaluator 701, according to one embodiment of the present invention, comprises a multitude of functions and associated software and hardware platforms; for example, databases, scripts and code, which can use heuristics and probability functions to initially classify events from the rule sets into the event database 703. On a near-real time basis, the event evaluator 701 monitors all network events to capture such events into the event database 703. In this manner, the system 505 can effectively respond to new threats or attacks. The event database 703, according to an embodiment of the present invention, is normalized to minimize traffic during data retrieval. The normalized event database 703 can be analyzed over time using an analysis system 705 that employs statistical predictive rules (SPR) (e.g., Receiver Operating Characteristic (ROC) curves) for a false positive rate versus a true positive rate for actual attacks.

The analysis system 705, which in an exemplary embodiment employs a heuristic engine, enables creation of new rules via a rules creation module 707. The predictive information from the SPR analysis system 705 is used to create a regular expression. The regular expression can be propagated by the provisioning engine 505*a* of the anomalous event detection system 505 to other anomalous event detection systems in the enterprise (e.g., system 503). Further, the regular expression can be sent for validation to a provisioning server (e.g., 403), if the installation/provisioning of the system 505 used the provisioning server.

The rules creation module 707 interacts with rule insertion scripts 709 to store the newly created rules in to the rule sets database 501. Additionally, to minimize bandwidth usage, the database 501 can utilize normalized data fields, as well as other database performance enhancement techniques. As noted earlier, the rules stored in the database 501 are time stamped, such that the most recent data set takes precedence.

Although the systems 503, 505 have been described with application to network intrusion detection, it is recognized that the capabilities of the systems 503, 505 can be applied to any security device deployed in a network, or application to any server based application deployed in a network.

Figure 8:
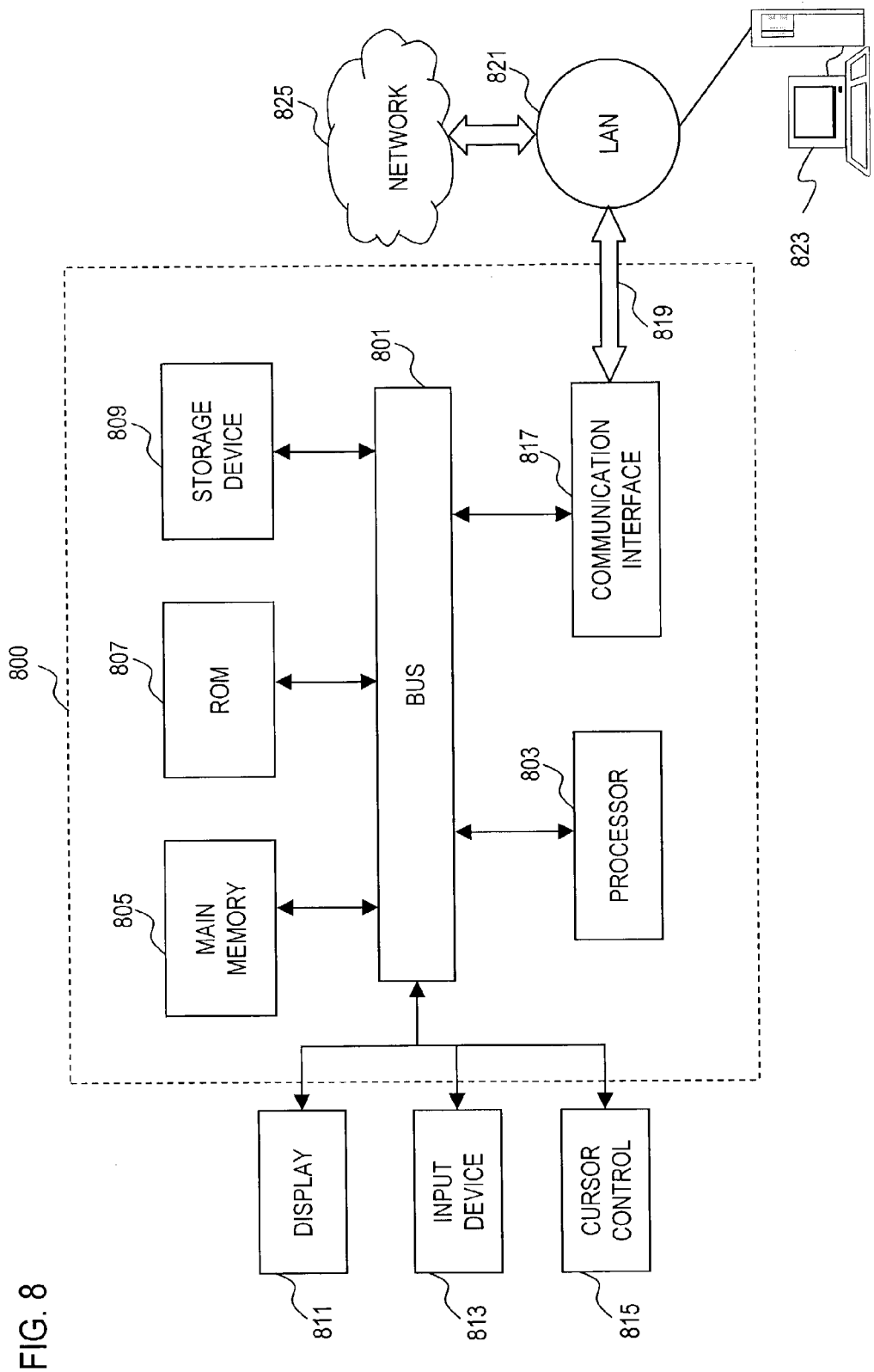
FIG. 8 is a diagram of a computer system that can be used to implement an embodiment of the present invention.

FIG. 8 illustrates a computer system 800 upon which an embodiment according to the present invention can be implemented. For example, the hardware platforms of the anomalous event detection systems 101 of FIG. 1 can be implemented using the computer system 800. The computer system 800 includes a bus 801 or other communication mechanism for communicating information and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to one embodiment of the invention, the processes of FIGS. 2 and 6 are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the present invention. Thus, embodiments of the present invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the present invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 805 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Accordingly, the present invention provides an approach for supporting managed security services utilizing a system that is self-organizing and self-provisioning to detect anomalous events with one or more enterprise networks. The anomalous event detection system, upon installation within the customer's premise, establishes a secure communication link (e.g., a Virtual Private Network (VPN) tunnel) to either a provisioning server or a pre-existing anomalous event detection system within the enterprise network for retrieval or rule sets associated with the enterprise network. The rule sets, according to one embodiment, specifies security policies governing the enterprise network. These rule sets can be updated, near real-time, across the enterprise network by the anomalous event detection system. When multiple anomalous event detection systems are installed within the enterprise network, these systems can from a cluster to efficiently share network resources. The above arrangement advantageously reduces false positives in network attack warnings.

While the present invention has been described in connection with a number of embodiments and implementations, the present invention is not so limited but covers various obvious modifications and equivalent arrangements, which fall within the purview of the appended claims.

What is claimed is:

1. A method for supporting managed security services, the method comprising:
   self-provisioning within an enterprise network that includes a plurality of interconnected networks by scanning the enterprise network to determine whether an instance of an anomalous event detection mechanism exists, to create the instance if the anomalous event detection mechanism does not exist, and to create automatically one or more additional instances of the anomalous event detection mechanism to accommodate expansion of the enterprise network; and
   accessing, by the anomalous event detection mechanism, a database storing a rule set specifying a security policy for the enterprise network for monitoring one of the networks according to the rule set.

2. A method according to claim 1, further comprising:
   associating a digital certificate with the rule set to indicate that the rule set is from a particular source.

3. A method according to claim 1, wherein the database in the accessing step resides within one of a server maintained by a service provider and a pre-existing anomalous event detection system within the enterprise network, the method further comprising:
   establishing a secure communication session with the server or the pre-existing anomalous event detection system to retrieve the rule set.

4. A method according to claim 3, wherein the secure communication session in the establishing step is a Virtual Private Network (VPN) tunnel.

5. A method according to claim 3, further comprising:
   storing an anomalous event from the one network;
   analyzing the anomalous event according to statistical predictive rules; and
   selectively creating a new rule in response to the analysis of the anomalous event.

6. A method according to claim 5, further comprising:
   inserting the new rule into the database to update the rule set, wherein the updated rule set is time-stamped to support retrieval of the latest modified rule set.

7. A method according to claim 1, further comprising:
   transmitting status information to a pre-existing anomalous event detection system within a cluster, wherein the monitoring of the one network is performed in conjunction with the pre-existing anomalous event detection system across the cluster.

8. A system for providing managed security services, the system comprising:
   a database configured to store a rule set specifying a security policy for a network associated with a customer; and
   an anomalous detection event module deployed within a premise of the customer and configured to retrieve the rule set from the database and to monitor a sub-network within the network based on the rule set, wherein the anomalous event detection module is further configured to self-organize by examining components of the network and to monitor for the anomalous event according to the examined components, and to self-provision by creating an initial instance of itself and selectively creating another instance to monitor another sub-network of the network.

9. A system according to claim 8, wherein the anomalous detection event module includes:
   an intrusion detection engine configured to detect the anomalous event using one of a signature-based scheme, and a heuristic scheme.

10. A system according to claim 8, wherein the anomalous detection event module includes:
    a provisioning engine configured to establish a secure communication session for accessing the database to retrieve the rule set.

11. A system according to claim 10, wherein the secure communication session is a Virtual Private Network (VPN) tunnel.

12. A system according to claim 10, wherein the database resides within one of a server maintained external to the network, and the provisioning engine establishes the secure communication session to the server.

13. A system according to claim 10, wherein the anomalous detection event module includes:
    an event evaluator configured to analyze the anomalous event according to statistical predictive rules, wherein a new rule is selectively created in response to the analysis of the anomalous event.

14. A system according to claim 13, wherein the new rule is inserted into the database to update the rule set, and the updated rule set is time-stamped to support retrieval of the latest modified rule set.

15. A system according to claim 13, wherein the anomalous detection event module includes:
    a certificate application configured to associate a digital certificate with the updated rule set to indicate that the updated rule set is from a particular source.

16. A computer-readable medium carrying one or more sequences of one or more instructions for supporting managed security services, the one or more sequences of one or more instructions including instructions which, when executed by one or more processors, cause the one or more processors to perform the steps of:
    self-provisioning within an enterprise network that includes a plurality of interconnected networks by scanning the enterprise network to determine whether an instance of an anomalous event detection mechanism exists, to create the instance if the anomalous event detection mechanism does not exist, and to create automatically one or more additional instances of the anomalous event detection mechanism to accommodate expansion of the enterprise network; and
    accessing, by the anomalous event detection mechanism, a database storing a rule set specifying a security policy for the enterprise network for monitoring one of the networks according to the rule set.

17. A computer-readable medium according to claim 16, wherein the one or more processors further perform the step of:
    associating a digital certificate with the rule set to indicate that the rule set is from a particular source.

18. A computer-readable medium according to claim 16, wherein the database in the accessing step resides within one of a server maintained by a service provider and a pre-existing anomalous event detection system within the enterprise network, and the one or more processors further perform the steps of:
    establishing a secure communication session with the server or the pre-existing anomalous event detection system to retrieve the rule set.

19. A computer-readable medium according to claim 18, wherein the secure communication session in the establishing step is a Virtual Private Network (VPN) tunnel.

20. A computer-readable medium according to claim 18, wherein the one or more processors further perform the steps of:
  storing an anomalous event from the one network;
  analyzing the anomalous event according to statistical predictive rules; and
  selectively creating a new rule in response to the analysis of the anomalous event.

21. A computer-readable medium according to claim 20, wherein the one or more processors further perform the step of:
  inserting the new rule into the database to update the rule set, wherein the updated rule set is time-stamped to support retrieval of the latest modified rule set.

22. A computer-readable medium according to claim 16, wherein the one or more processors further perform the step of:
  transmitting status information to a pre-existing anomalous event detection system within a cluster, wherein the monitoring of the one network is performed in conjunction with the pre-existing anomalous event detection system across the cluster.

23. A network apparatus for supporting managed security services, the apparatus comprising:
  means for self-provisioning within an enterprise network that includes a plurality of interconnected networks by scanning the enterprise network to determine whether an instance of an anomalous event detection mechanism exists, to create the instance if the anomalous event detection mechanism does not exist, and to create automatically one or more additional instances of the anomalous event detection mechanism to accommodate expansion of the enterprise network; and
  means for accessing, by the anomalous event detection mechanism, a database storing a rule set specifying a security policy for the enterprise network and means for monitoring one of the networks according to the rule set.

24. An apparatus according to claim 23, further comprising:
  means for associating a digital certificate with the rule set to indicate that the rule set is from a particular source.

25. An apparatus according to claim 23, wherein the database resides within one of a server maintained by a service provider, the apparatus further comprising:
  means for establishing a secure communication session with the server to retrieve the rule set.

26. An apparatus according to claim 25, wherein the secure communication session is a Virtual Private Network (VPN) tunnel.

27. An apparatus according to claim 25, further comprising:
  means for storing an anomalous event from the one network;
  means for analyzing the anomalous event according to statistical predictive rules; and
  means for selectively creating a new rule in response to the analysis of the anomalous event.

28. An apparatus according to claim 27, further comprising:
  means for inserting the new rule into the database to update the rule set, wherein the updated rule set is time-stamped to support retrieval of the latest modified rule set.

29. An apparatus according to claim 27, further comprising:
  means for transmitting status information to a pre-existing anomalous event detection system within a cluster, wherein the monitoring of the one network is performed in conjunction with the pre-existing anomalous event detection system across the cluster.

* * * * *